(12) United States Patent
Grygorowicz

(10) Patent No.: US 8,215,416 B2
(45) Date of Patent: Jul. 10, 2012

(54) DEVICE FOR ASSISTING IN ACTUATING A TOOL

(75) Inventor: Serge Grygorowicz, Gy l'Eveque (FR)

(73) Assignee: Robotiques 3 Dimensions SARL (RB 3D), Auxerre (FR)

( * ) Notice: Subject to any disclaimer, the term of this patent is extended or adjusted under 35 U.S.C. 154(b) by 227 days.

(21) Appl. No.: 12/438,054

(22) PCT Filed: Aug. 22, 2007

(86) PCT No.: PCT/FR2007/001388
§ 371 (c)(1),
(2), (4) Date: Dec. 29, 2009

(87) PCT Pub. No.: WO2008/023117
PCT Pub. Date: Feb. 28, 2008

(65) Prior Publication Data
US 2010/0163263 A1    Jul. 1, 2010

(30) Foreign Application Priority Data
Aug. 22, 2006  (FR) ..................... 06 07446

(51) Int. Cl.
*B23B 45/02* (2006.01)
(52) U.S. Cl. ........................ 173/170; 173/171
(58) Field of Classification Search .................. 173/170; 29/229; 30/248, 246; 81/302, 314, 407
See application file for complete search history.

(56) References Cited

U.S. PATENT DOCUMENTS

| | | | | |
|---|---|---|---|---|
| 2,613,437 A * | 10/1952 | McPhee | ........................ | 30/228 |
| 3,169,307 A * | 2/1965 | Langwell | ........................ | 29/229 |
| 3,397,567 A * | 8/1968 | Klinger | ........................ | 72/416 |
| 3,401,455 A * | 9/1968 | Gebauer | ........................ | 30/228 |
| 5,177,871 A * | 1/1993 | Martenson | ........................ | 30/122 |
| 5,250,060 A * | 10/1993 | Carbo et al. | ........................ | 606/159 |

* cited by examiner

*Primary Examiner* — Rinaldi Rada
*Assistant Examiner* — Nathaniel Chukwurah
(74) *Attorney, Agent, or Firm* — Harness, Dickey & Pierce, P.L.C.

(57) ABSTRACT

The application relates to a device for assisting in actuating a tool comprising two arms that are movable in rotation around an axis between an open position in which the arms are separated from each other, and a closed position in which the arms are close to each other, the device further comprising a cable at one end part of which is associated with one of the arms, the other end part of the cable being disposed in a cable tensioner, the tensioner being associated with the other arm, the device further comprising actuating the tensioner between an open position in which the cable is unwound, the arms being in an open position, and a closed position in which the cable is wound so as to move the arms into their closed position.

5 Claims, 3 Drawing Sheets

DEVICE FOR ASSISTING IN ACTUATING A TOOL

CROSS-REFERENCE TO RELATED APPLICATIONS

This application is a National Phase Entry of International Application No. PCT/FR2007/001388, filed Aug. 22, 2007, claiming priority to French Patent Application No. 06/07446, filed Aug. 22, 2006, both of which are incorporated herein by reference.

BACKGROUND AND SUMMARY

The invention concerns a device for assisting the actuation of a tool comprising two arms able to move in rotation about an axis. The invention applies to any type of tool as defined above. These tools are for example pliers, secateurs or the like.

Such tools are actuated by moving the arms towards each other. For this purpose, the arms are able to move in rotation between an open position in which the arms are distant from each other and a closed position in which the arms are close to each other. The forces exerted by the tool (cutting or clamping force for example) are directly proportional to the forces exerted by the user on the arms when passing from the open position to the closed position. The forces imposed on the user are therefore sometimes high and may give rise to fatigue or pain if the tool is used frequently or for operations demanding a special force.

The invention aims to mitigate these drawbacks by proposing a device for assisting the actuation of such a tool making it possible to reduce or even eliminate the forces demanded of a user for actuating the tool. For this purpose, the invention concerns a device assisting the actuation of a tool comprising two arms able to move in rotation about an axis between an open position in which the arms are distant from each other and a closed position in which the arms are close to each other, the said device comprising a cable, the end part of which is associated with one of the said arms, the other end part being disposed in a cable tensioner, the said tensioner being associated with the other arm, the said device comprising means for actuating the tensioner between an open position in which the cable is slack, the arms being in the open position, and a closed position in which the cable is tensioned so as to make the arms pass to their closed position.

According to one example embodiment, the tensioner is a winder. Thus the forces for actuating the tool are provided at least partly by the winding of the cable in the winder without the user having to effect high clamping forces about the arms in order to make them pass to the closed position. According to a variant, the tensioner consists of a screw and nut mechanism.

This solution is advantageous since the screw and nut mechanism makes it possible to dispense with the use of a reduction gear connected to the actuation means. This is because the screw and nut mechanism now includes reduction gearing. The actuation means are therefore directly connected to the screw and nut mechanism, which gives rise to significant saving in space on the device.

Preferably, the means for actuating the tensioner are separate from the tool. The term separate means that, even if the actuation means are mechanically connected to the assistance device fixed to the tool, they are not for all that fixed to this tool. This arrangement makes it possible to offset the actuation means and the batteries, which represent a load for the user, in a separate box that can be placed on a table or carried on the belt. Thus the user does not have to support the weight of the actuation means and the battery at arms length.

Advantageously, the actuation means transmit the tension force to the tensioner by means of a flexible link. The use of a flexible link makes it possible to transmit a rotation movement between two elements free with respect to each other. The flexible link is preferably integrated in an external protective sheath that also comprises at least one electric cable connecting the actuation means to the rest of the device. The electric cable transmits the control and sensor signals to the actuation means.

According to one embodiment, the actuation means comprise an electric motor. According to one embodiment, the device comprises a force sensor for the actuation of the arms by a user, the said sensor being coupled to the actuation means so that the winding force of the cable is proportional to the force for actuation of the arms by the user. Thus the user keeps the sensation of forces to be effected for actuating the tool, although these forces are considerable reduced. It is important that this sensation be preserved in order to prevent ill-advised manoeuvres of the tool (excess clamping or cutting of an object that is not desired, for example). Means for adjusting the forces exerted by the device can be provided. The user can then choose what proportion of force he wishes to keep in actuating the tool.

The device comprises a counter for the cycles of use of the tool, the said counter being arranged to count the number of passages from the open position to the closed position and/or vice versa. Thus the device makes it possible to obtain information on the service life of the tool, which may be particularly useful in the case of repeated use (in a factory for example) of this tool.

BRIEF DESCRIPTION OF DRAWINGS

The invention will be clearly understood from a reading of the following description given with reference to the accompanying figures.

DETAILED DESCRIPTION

Figure 1:
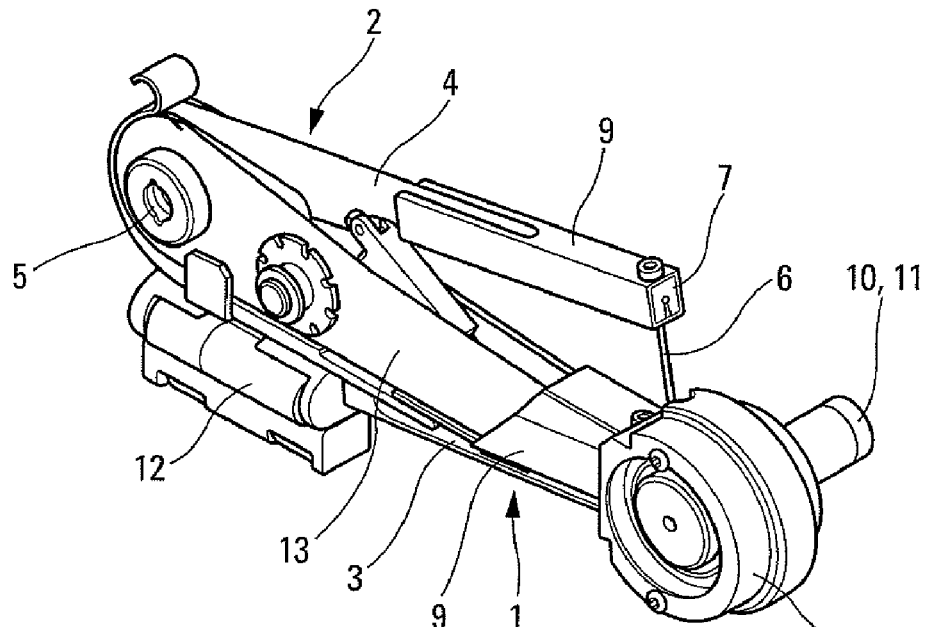
FIG. 1 is a schematic representation in perspective of the assistance device according to the invention in which the tensioner is a winder, the said device comprising a winder and being associated with a crimping tool.
Figure 2B:
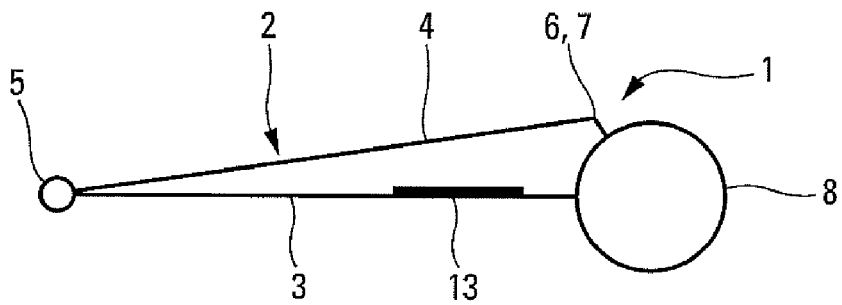
FIGS. 2a and 2b are schematic representations showing the functioning of the assistance device associated with two arms able to move in rotation about an axis, in the open position and in the closed position.
Figure 2A:
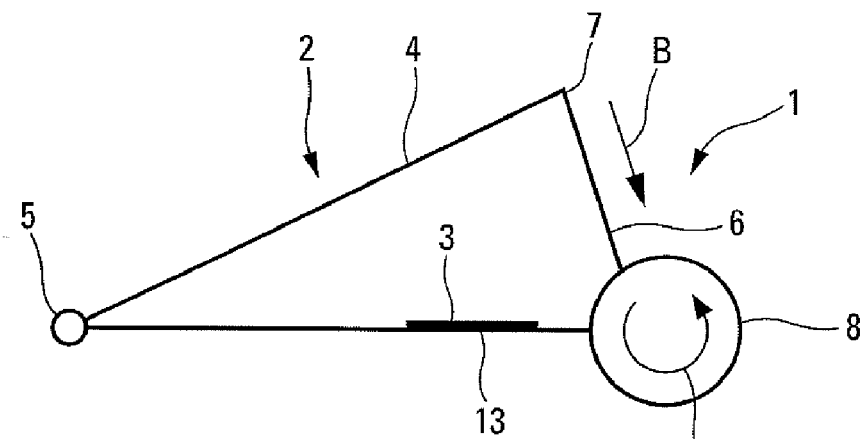

With reference to FIGS. 1, 2a and 2b, a device 1 for assisting with the actuation of a tool 2 comprising two arms 3 and 4 able to move in rotation about an axis 5 is described. The arms 3 and 4 are able to move between an open position in which the arms are distant from each other as shown in FIG. 2a and a closed position in which the arms are close to each other as shown in FIG. 2b. In the example embodiment shown in FIG. 1, the tool 2 is a crimping tool. However, other types of tool comprising two arms able to move with respect to each other in rotation about an axis can be envisaged, such as pliers or secateurs for example.

According to a first embodiment, the assistance device 1 comprises a cable 6, an end part 7 of which is associated with one of the arms 4. The other end part of the cable 6 is disposed in a cable tensioner, in the form of a winder 8, associated with the other arm 3. Thus the cable 6 is tensioned between the arms 3 and 4 in the open position of the arms, as shown in FIG. 2*a*, and is wound around the winder 8, in the closed position of the arms as shown in FIG. 2*b*.

The free end part 7 of the cable 6 and the winder 8 are for example each associated with a sheath 9. Each sheath 9 fits around one of the arms 3 and 4, as shown in FIG. 1. All the elements of the assistance device 1 can be associated with these sheaths 9, so that the device 1 forms an assembly independent of the tool 2. Thus the assistance device 1 can be associated with a tool then dissociated from it in order to be associated with another tool for example. The winder 8 makes it possible to make the arms 3 and 4 pass from their open position to their closed position by winding the cable 6 (arrow A in FIG. 2*a*), which has the effect of pulling the arm 4 towards the arm 3 (arrow B in FIG. 2*b*). To this end, the device 1 comprises means 10 for actuating the winder 8.

According to one embodiment, the actuation means comprise an electric motor 11 arranged to actuate the winder 8 in rotation so as to wind the cable 6. The motor may be of any type. It may for example be a piezoelectric motor or other. As shown in FIG. 1, the motor 11 can be supplied with current by a current source 12, such as a battery. The actuation means 10 are reversible, that is to say they make it possible to actuate the winder in winding as well as unwinding.

The free end part 7 of the cable 6 and the winder 8 are associated with the arms 3 and 4 at the free end part of these, that is to say in the position furthest away from the rotation axis 5. Such a design limits the torque necessary to make the tool pass from the open position to the closed position. The winder 8 is therefore less stressed and it is possible to reduce the power of the motor 11. According to another embodiment, the winder can be disposed at a point other than the end part of the arm. Thus it is possible to provide a return system for the cable at the end of the arm with which the winder is associated, for example a pulley to make it possible to dispose the winder at another point on the arm while making the cable pass through this end.

The device 1 can comprise a force sensor 13 for the actuation of the arms 3 and 4 by a user. The sensor is for example associated with the sheath 9 to which the end part 7 of the cable 6 is fixed or another sheath 9, and is disposed at a point where the user grips the tool 2 in order to actuate it, for example where the user places the palm of his hand. The force sensor 13 is for example a strain gauge fixed to a blade in contact with the palm of the hand. The sensor 13 is coupled to the actuation means 10 so that the force for winding the cable 6 is proportional to the force for actuating the arms 3 and 4 by the user.

According to one embodiment, the sensor 13 is also used for triggering the actuation means 10. Thus provision can be made for the actuation means 10 to actuate the winder 8 when the force detected by the force sensor 13 is above a predefined threshold. Thus it is not necessary to provide a movement start system for the actuation means 10.

The device 1 can comprise means for adjusting the forces adopted exerted by the device to enable the user to choose the quantity of force that he will have to provide to actuate his tool. For example, the user can adjust the device so that it exerts substantially ⅘ or half the forces allowing passage from the open position to the closed position. The remaining forces fall to the user when he actuates the arms 3 and 4 of the tool 2. Thus the user keeps the sensation of a force for making the tool pass from the open position to the closed position. This sensation is particularly important for the user, who can thus be aware of faulty operation of the tool. For example, if the tool is secateurs and a metal rod is situated on the cutting path, the user will be able to become aware of this presence through the increase in the force he will have to provide to close the secateurs.

The device 1 may comprise a counter for the use cycles of the tool (not shown). This counter is arranged to count the number of passages from the open position to the closed position and/or vice versa. Such a counter thus makes it possible to obtain information on the service life of the tool, which may be particularly useful in the case of repeated use of the tool. The actuation means 10 can be arranged to drive the winder 8 as far as the closed position when passage from the open position to the closed position has been triggered and to then return to the open position as long as the closed position has not been reached. To this end, the device can comprise sensors for the open position and the closed position (not shown).

For tools having different actuation levels, several adjustment sizes for example, it is possible to provide means for selecting force profiles applied by the winder 8 to the cable 6. Thus it is possible to adapt the force applied by the winder 8 to the size of the tool. The device 1 can then comprise information storage means in which the said force profiles are recorded. The user can then select a profile according to the size of the tool.

Figure 3A:
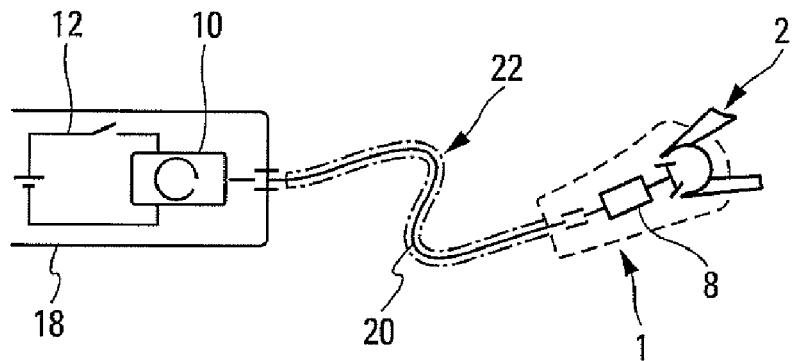
FIGS. 3a, 3b, 3c are schematic representations of an example embodiment of an assistance device according to the invention in which the actuation means are disconnected from the device.
Figure 3B:
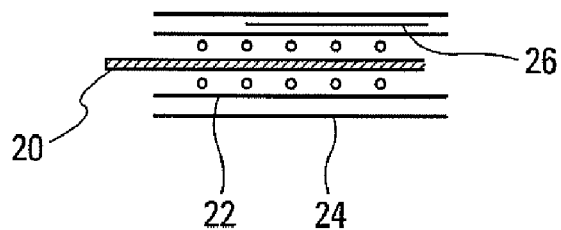
Figure 3C:
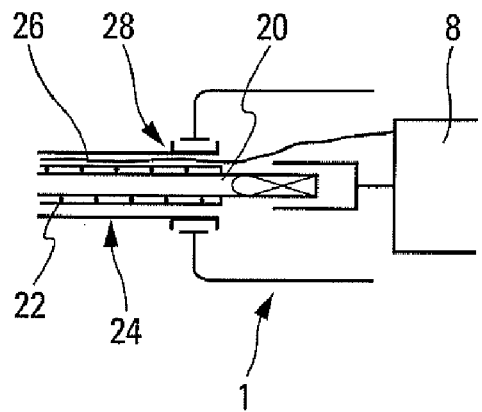

A variant embodiment of the assistance device according the invention is shown in FIG. 3. In this variant, the actuation means 10 and the current source 12 are disconnected from the tool 2 and placed in a housing 18. Thus the housing 18 can be deposited on a work table or hooked onto the belt, at a distance from the assistant device. The rotation movement is then transmitted by a flexible link 20 with a circular cross section disposed between the actuation means 10 and the tensioner 8. The force is thus transmitted by means of a flat.

According to one embodiment, the actuation means 10 comprise a geared motor, also placed in the housing 18. Alternatively, the gearing can be placed on the tool 2 and coupled with the flexible link 20. The flexible link 20 is covered with a spiral internal protective sheath 22. The spiral serves to stiffen the assembly consisting of flexible link 20 and internal protective sheath 22, so as to prevent the flexible link 20 being able to be damaged.

The spiral internal protective sheath 22 and the flexible link 20 are included in an external protective sheath 24 that also includes an electric cable 26. The electric cable 26 connects the actuation means 10 with the rest of the assistance device 10. The control or sensor signals for the device are routed as far as the actuation means 10 by means of this electric cable 26. Advantageously, the external protective sheath 24 is free to rotate with respect to housing 18 and assistance device 1. According to one embodiment, the pivot connection is achieved by means of a crimped ring 28 on the external protective sheath 24.

Figure 4:
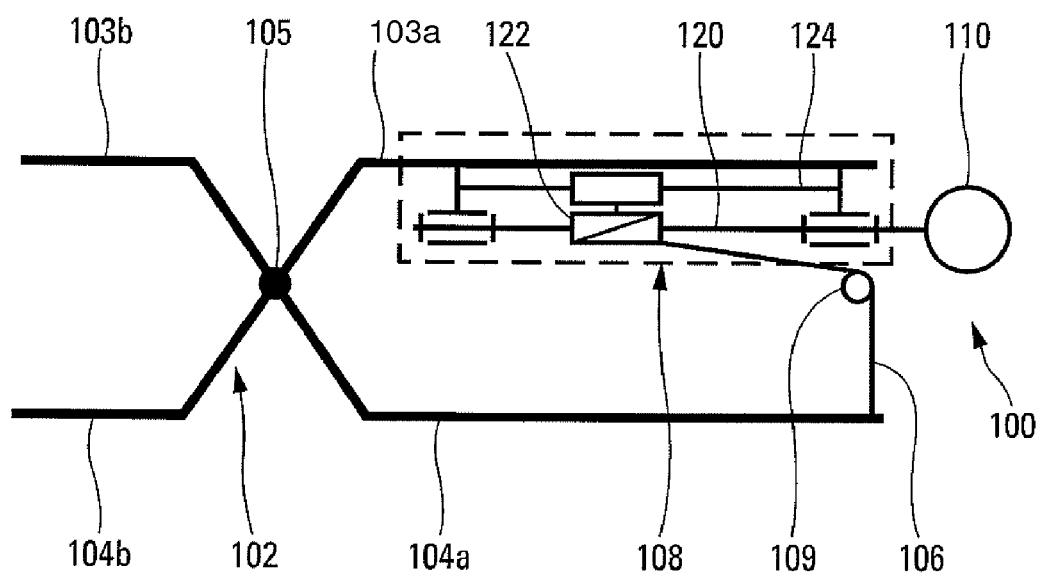
FIG. 4 is a schematic representation of another example embodiment of an assistance device according to the invention in which the tensioner comprises a screw and nut mechanism, the said device being associated with a clamp with two arms.

An example embodiment of an assistance device 100 according to the invention is shown in FIG. 4. In this example, the tool 102 is a gripper that also has two arms 103*a*, 104*a* able to move in rotation about an axis 105 as well as two gripping branches 103*b*, 104*b* respectively in line with the arms 103*a*, 104*a*. When the arms 103*a*, 104*a* are in the open position, the gripping branches 103*b*, 104*b* are open. In the same way, when the arms 103*a*, 104*a* are in the closed position, the gripping branches 103*b*, 104*b* are closed.

The assistance device 100 also comprises a flexible cable 106, an end part of which is associated with one of the arms 104*a*. The other end part of the flexible cable 106 is disposed in a tensioner, associated with the arm 103*a*, which actuates the opening and closing of the tool 102. Advantageously, the flexible cable 106 passes over a pulley 109. Thus the direction of the force imposed by the flexible cable 106 on the arm 104*a* is substantially perpendicular to the arm 104*a*.

In this example embodiment, the tensioner consists of a screw and nut mechanism 108. A threaded rod 120 is in pivot connection with respect to the arm 103*a*. A nut 122 is in helical connection with respect to the threaded rod 120 and in sliding connection with respect to an axis 124 fixed with respect to the arm 103*a*.

Thus, when the threaded rod 120 starts to rotate, the nut 122 moves along the threaded rod so as to tension or slacken the flexible cable 106, according to the direction of rotation of the threaded rod. When the flexible 106 is tensioned, the arms 103*a* and 104*a* move closer together and close the tool 102. Conversely, when the flexible cable 106 relaxes, the arms 103*a* and 104*a* move away from each other and the tool 102 opens. The means 110 for actuating the tensioner 8, 108 consist of an electric motor 111 that drives the threaded rod 120 in rotation, thus actuating the opening or closing of the gripper 102.

The invention claimed is:

1. A device for assisting the actuation of a tool, the device comprising two arms able to move in rotation about an axis between an open position in which the arms are distant from each other and a closed position in which the arms are close to each other, the device further comprising a cable, an end part of which is associated with one of the arms, the other end part of the cable being disposed in a cable tensioner, the tensioner being associated with the other arm, the device further comprising an actuator operably actuating the tensioner between an open position in which the cable is slack, the arms being in the open position, and a closed position in which the cable is tensioned so as to make the arms pass into their closed position, the device further comprising a force sensor for the actuation of the arms by a user, the sensor being coupled to the actuator so that the tension force of the cable is proportional to the force of actuation of the arms by the user.

2. An assistance device according to claim 1, wherein the actuator is arranged to actuate the tensioner when the force detected by the force sensor is above a predefined threshold.

3. A device for assisting the actuation of a tool, the device comprising two arms able to move in rotation about an axis between an open position in which the arms are distant from each other and a closed position in which the arms are close to each other, the device further comprising a cable, an end part of which is associated with one of the arms, the other end part of the cable being disposed in a cable tensioner, the tensioner being associated with the other arm, the device further comprising an actuator operably actuating the tensioner between an open position in which the cable is slack, the arms being in the open position, and a closed position in which the cable is tensioned so as to make the arms pass into their closed position, the device further comprising an adjuster operably adjusting the forces exerted by the device to allow passage from the open position to the closed position.

4. A device for assisting the actuation of a tool, the device comprising two arms able to move in rotation about one axis between an open position in which the arms are distant from each other and a closed position in which the arms are close to each other, the device further comprising a cable an end part of which is associated with one of the arms, the other end part of the cable being disposed in a cable tensioner, the tensioner, being associated with the other arm, the device further comprising an actuator operably actuating the tensioner between an open position in which the cable is slack, the arms being in the open position, and a closed position in which the cable is tensioned so as to make the arms pass into their closed position; and a selector operably selecting force profiles applied by the tensioner to the cable, the device comprising information storage in which the force profiles are recorded.

5. A device for assisting the actuation of a tool, the device comprising two arms where the user exerts its force and able to move in rotation about one axis between an open position in which the arms are distant from each other and a closed position in which the arms are close to each other, the device further comprising a cable an end part of which is associated with one of the arms, the other end part of the cable being disposed in a cable tensioner, the tensioner, being associated with the other arm, the device further comprising an actuator operably actuating the tensioner between an open position in which the cable is slack, the arms being in the open position, and a closed position in which the cable is tensioned so as to make the arms pass into their closed position, wherein the tensioner includes a threaded rod and a nut threaded onto the threaded rod and wherein the threaded rod is rotatably fixed to the other arm and the nut is fixed to the cable such that rotating the threaded rod translates the nut and moves the arms to their closed position.

\* \* \* \* \*